US011462785B2

(12) United States Patent
Björneklett et al.

(10) Patent No.: US 11,462,785 B2
(45) Date of Patent: Oct. 4, 2022

(54) IMMERSION COOLING OF BATTERY DEVICE

(71) Applicant: APR Technologies AB, Enköping (SE)

(72) Inventors: Are Björneklett, Västerås (SE); Peter Nilsson, Sundbyberg (SE); Robert Thorslund, Sigtuna (SE)

(73) Assignee: APR Technologies AB

( * ) Notice: Subject to any disclaimer, the term of this patent is extended or adjusted under 35 U.S.C. 154(b) by 0 days.

(21) Appl. No.: 17/254,776

(22) PCT Filed: Jun. 24, 2019

(86) PCT No.: PCT/EP2019/066699
§ 371 (c)(1),
(2) Date: Dec. 21, 2020

(87) PCT Pub. No.: WO2020/002254
PCT Pub. Date: Jan. 2, 2020

(65) Prior Publication Data
US 2021/0265683 A1    Aug. 26, 2021

(30) Foreign Application Priority Data
Jun. 25, 2018   (EP) .................................... 18179528

(51) Int. Cl.
*H01M 10/613* (2014.01)
*H01M 10/6568* (2014.01)
(Continued)

(52) U.S. Cl.
CPC ..... *H01M 10/6568* (2015.04); *H01M 10/613* (2015.04); *H01M 10/63* (2015.04); *H01M 10/6557* (2015.04); *H01M 50/682* (2021.01); *H01M 50/691* (2021.01); *H01M 2010/4271* (2013.01)

(58) Field of Classification Search
CPC .......... H01M 10/6568; H01M 10/613; H01M 10/63; H01M 10/6557
See application file for complete search history.

(56) References Cited

U.S. PATENT DOCUMENTS

2002/0137121 A1*   9/2002   Rubinsky ........... G01N 33/5014
                                                                  435/29
2010/0291414 A1   11/2010   Bell et al.
(Continued)

FOREIGN PATENT DOCUMENTS

CN       106785203 A    5/2017
CN       108011158 A    5/2018
(Continued)

*Primary Examiner* — Olatunji A Godo
(74) *Attorney, Agent, or Firm* — Condo Roccia Koptiw LLP (57) ABSTRACT

A battery device (100) is disclosed, comprising a plurality of cells (110), an enclosure (120) configured to accommodate cells when they are at least partly immersed in a thermal management liquid, and at least one flow unit (130) arranged within the enclosure to control a flow of the thermal management liquid through the enclosure. The at least one flow unit comprises a first electron (131) and a second electrode (132) that are arranged offset from each other and being connectable to a voltage source so as to affect the flow between the electrodes.

20 Claims, 7 Drawing Sheets

(51) Int. Cl.
*H01M 10/63* (2014.01)
*H01M 10/6557* (2014.01)
*H01M 50/682* (2021.01)
*H01M 50/691* (2021.01)
*H01M 10/42* (2006.01)

(56) References Cited

U.S. PATENT DOCUMENTS

| | | |
|---|---|---|
| 2012/0121487 A1 | 5/2012 | Jewell-Larsen et al. |
| 2014/0338713 A1* | 11/2014 | Nakanuma .............. H01L 35/30 |
| | | 136/204 |
| 2017/0352930 A1 | 12/2017 | Masias et al. |
| 2018/0143159 A1* | 5/2018 | Cotton ................. H01H 1/0036 |
| 2018/0166360 A1* | 6/2018 | Thorslund ............... F04B 19/06 |

FOREIGN PATENT DOCUMENTS

| | | |
|---|---|---|
| EP | 2605328 A2 | 6/2013 |
| WO | 2016/195570 A1 | 12/2016 |

* cited by examiner fig. 1a fig. 1b

IMMERSION COOLING OF BATTERY DEVICE

CROSS REFERENCE TO RELATED APPLICATIONS

This application is the National Stage Entry under 35 U.S.C. § 371 of Patent Cooperation Treaty Application No. PCT/EP2019/066699, filed 24 Jun. 2019, which claims priority from European Application No. 18179528.7, filed 25 Jun. 2018, the contents of which are hereby incorporated by reference herein in their entireties.

FIELD OF THE INVENTION

The invention disclosed herein relates to rechargeable batteries, and in particular to techniques for thermal management of such batteries.

BACKGROUND OF THE INVENTION

In recent years, rechargeable batteries, also referred to as secondary cells and storage batteries which can be used repeatedly, have been used as power sources for driving mobile electronic devices, portable communication devices etcetera. Further, to reduce the amount of use of fossil fuel and reduce the amount of emission of carbon dioxide, the rechargeable batteries have been expected to be used as a power source for driving a vehicle.

The performance of the rechargeable battery is to a large extent limited by the available thermal management techniques for keeping the battery within an appropriate temperature range. Increased energy storage capacity and reduced charging times have led to a strive for more efficient thermal management in general, and dissipation of generated heat in particular.

One commonly employed thermal management method is known as immersion cooling, which also referred to as liquid submersion cooling. This is the practice of submerging components, such as e.g. battery cells, in a thermally conductive liquid. Thus, the heat may be transferred directly from the heat source to the working fluid and dissipated through a heat exchanger located elsewhere.

With the ever increasing performance requirements regarding storage capacity and strive for more space efficient systems, there is a need for improved and more efficient thermal management techniques.

SUMMARY

Thus, it is an object of the present invention to provide an improved thermal management technique. It is a particular object to provide an improved battery and a method in such a battery.

According to a first aspect, a battery device is provided, comprising a plurality of cells, an enclosure for accommodating the cells and a thermal management fluid, such as a thermal management liquid, and at least one flow unit arranged within the enclosure.

In a second aspect, a method is provided in which the flow unit may be activated to induce a flow of the thermal management fluid in the enclosure, and/or deactivated to impede or hamper a flow of the thermal management unit.

The battery device, or pack, may comprise a plurality of individual cells that may be configured in series, parallel or a mixture of both to deliver a desired voltage, capacity or power density. The cells may be at least partly submerged in the thermal management fluid configured to transfer heat to and from the cells, and arranged within the enclosure accommodating the fluid.

To ensure efficient heat control and to reduce the risk of overheating (or freezing) of individual cells, it is advisable to let the thermal management fluid circulate or move within the enclosure to facilitate distribution and transfer of heat within the enclosure.

The present invention is advantageous in that by arranging a flow unit within the enclosure, a more precise control of the distribution and flow of the thermal management fluid within the enclosure may be achieved. The control of the flow or circulation may be more efficient and precise compared to implementations utilizing an external pump located outside the enclosure. In those cases, the flow or circulation of the thermal management fluid is defined by the position and orientation of the inlet and outlet of the enclosure. Thus, by using the flow units for controlling or affecting the flow of the thermal management fluid in the enclosure, a faster and more balanced charging may be obtained. Further, the flow unit may be employed to direct a flow towards a specific region or surface portion of a cell, so as to pinpoint for example hot spots or other regions for example requiring additional cooling. The flow may for example be directed to a terminal region of the cell, or other portions or structures in which excessive heating risks to occur. In a particular example, the collector electrode of the flow unit may be arranged directly on, or be formed by, a surface of the cell so as to further increase the flow towards the surface and to allow the thermal management fluid to impinge on the surface.

According to an embodiment, a plurality of flow units may be arranged within the enclosure to further improve the flow of the fluid. Further, they may be individually and separately controlled based on a desired or determined flow pattern of the fluid. This allows for the cooling (or heating) to be increased or decreased in specific regions of the battery, depending on the current demand. In one example, the plurality of flow units may be operated to increase the cooling of a particular cell generating excessive heat.

According to an embodiment, the at least one flow unit may be arranged adjacent to at least one of the cells. Put differently, the flow unit may be positioned in a close vicinity of a particular cell to increase or facilitate the flow of thermal management fluid at that cell. This allows for the heat transfer between the cell and the fluid to be more efficient.

According to some embodiments, the cells may be arranged in a structured manner, such as for example side by side forming an array, or a stack or pile of several layers of cells. With this arrangement, a flow path may be formed between neighbouring cells—a flow path that may experience a non-negligible flow resistance due to a relatively small width to length ratio of the path. Advantageously, a flow unit may be arranged in the flow path, i.e., between two neighbouring cells, or at an entrance/outlet of the flow path, to increase the flow of the thermal management fluid along the path. By enhancing the flow, the flow path can be made longer and/or smaller, which is desirable from a space efficiency point of view. Thus, employing the flow units to increase the flow between cells allows for improved thermal management and more compact batteries.

According to an embodiment, the cells may be grouped into at least two separate blocks or modules with the at least one flow unit arranged between said modules. Thus, it is appreciated that the flow unit(s) may be positioned at a large number of positions within the enclosure, such as on, at or adjacent individual cells, between neighbouring cells, and between groups or rows of cells. Put differently, the flow units may be arranged wherever there is a need for improved control (such as enhancement or impediment) of the flow.

The flow unit can be formed as a relatively small unit, having a size and shape that makes it flexible and useful in terms of positioning within the enclosure and in operable contact with the thermal management fluid. Thus, the flow unit(s) can be positioned in narrow flow paths and at in other small spaces in which an extra pump effect, or increased control of the fluid, is desired. The flow unit may also be referred to a micro pump. Preferably, the flow unit is immersed in the thermal management fluid, such as a liquid, together with the cell. The enclosure may be configured to be completely filled with a thermal management fluid, or, particularly in case of a liquid thermal management fluid, only partly filled with the liquid. In case of a partial filling of the enclosure, the cell may be arranged such that the part of the cell that needs the thermal management the most, may be immersed in the liquid.

The present invention is advantageous in that the flow unit uses an electrode pair forming an electrohydrodynamical (EHD) pump wherein the fluid is accelerated by an electric field applied between the electrode pair. A pump effect may hence be achieved, which operates without mechanical action. Thus, the action can be achieved without involving any moving parts, which allows for the pump or flow unit to be relatively small compared to mechanical pumps and the overall weight of the battery to be reduced.

Further, the flow unit can be activated and deactivated, or even reversed, in order to act or operate as a valve that can open, reduce or even close a flow passage. By activating the flow unit, i.e., applying a voltage difference between the electrodes, the flow unit may be brought to flow or circulate through the flow unit. By deactivating, or turning off the flow unit, it may be put in an operational mode wherein the flow through the flow unit may be reduced or even eliminated. This may e.g. be achieved by reducing or removing the voltage difference between the electrodes, or applying a voltage difference counteracting a flow through the flow unit. By reducing or eliminating the flow through the flow unit, the circulation of the fluid passing by a specific cell or region in the battery may be reduced or even stopped. This may be an advantage in situations when heat needs to be preserved in the cell in order to provide a suitable or optimal operating temperature. Thus, the present invention may allow for a battery in which the operating temperature more easily can be reached and maintained.

According to some embodiments, at least one of the electrodes may comprise bridges and joints forming a grid structure arranged to allow the thermal management fluid to flow through the grid. Further, at least a portion of the bridges may have a maximum height in a direction parallel to the flow and a maximum gauge or width in a direction orthogonal to the flow, wherein the maximum height is larger than the maximum gauge. By forming a grid of bridges that have a relatively large height in relation to their gauge, the grid may be relatively rigid in terms of its ability to carry mechanical loads in the height direction of the bridges, or the direction of the flow. Thereby, a relatively rigid electrode is provided, which is less prone to bend or deform, especially in the direction of the flow, and hence the risk of e.g. short-circuiting of the flow unit may be reduced. Further, the relatively rigid and stable grid may still have a relatively large open area providing a relatively low flow resistance. Further, the relatively high and narrow bridges may reduce the amount of material required for forming a stable and rigid grid, which may reduce both weight and cost of the flow unit. By using a relatively rigid grid, the need for additional support structures may be reduced and a relatively well defined and constant spacing between the first and second electrodes may be maintained.

With their relatively large height, the bridges may also provide a large contact surface between the grid structure and the passing fluid, which may facilitate any interactions between the electrode and the fluid, such as e.g. diffusion of material and/or injection of ions or electrons.

It will be appreciated that even though a first one of the electrodes may have the above described grid configuration, the other one of the electrodes is not limited to such a configuration. Rather, various different configurations are conceivable, such as e.g. a wire extending along the first one of the electrodes, or a plurality of peaks, tips or whiskers pointing towards the first one of the electrodes.

The first electrode may also be referred to as an "emitter" or "emitter electrode", whereas the second electrode may be referred to as a "collector" or "collector electrode". During use, the emitter may be adapted to emit electrons into the fluid and/or to negatively charge matter, such as particles or impurities of the fluid, in a close proximity of the emitter.

The first and/or second electrodes may advantageously comprise a material that has a relatively good ability to emit electrons and is chemically stable, or inter, to the fluid. Examples of such materials may include Pt, Au, Ni, W, Zr and stainless steel.

In the present specification, the term "flow unit" or "(internal) pump" may be interchangeably used.

According to an embodiment, the cells may be cylindrical cells or prismatic cells arranged side by side in a stacked or piled manner. The cells may be grouped into a module, and a plurality of modules may form a pack.

According to an embodiment, the battery device may comprise (for be comprised in a system comprising) a first conduit for supplying the thermal management fluid to the enclosure, a second conduit for discharging the fluid from the enclosure, and an external pump for circulating the thermal management fluid through the enclosure by means of the conduits. In some examples, the conduits may be connected to a heat exchanger or heat sink for dissipating heat from the fluid.

In such a system, the flow units arranged in the enclosure, which hence can be regarded as internal pump units rather than external pump units (with reference to the enclosure), may cooperate with the external pump unit to increase, enhance or direct the flow inside the enclosure. In one example, the external pump may generate the main pump action and maintain the general circulation of the thermal management fluid in the overall system, whereas the flow units in the enclosure may be employed to further increase the flow in specific regions, to direct the flow to certain cells, and to modify the fluidic environment in the enclosure in order to improve or even optimize the overall heat management of the system.

According to an embodiment, the flow units may be operably connected to a control circuitry configured to operate at least some of the flow units independently of each other. The operation may for example be based in input from a performance sensor, such as e.g. a temperature sensor or a sensor monitoring a recharging process, which allows for an efficient and dynamic control of the heat management and heat distribution. If for example a local heat concentration is detected in the enclosure, flow units in that region (or nearby flow units) may be activated or controlled to increase the flow of the thermal management fluid in the region, thereby increasing the cooling.

The circuitry may form part of a battery management system, BMS, which may be configured to monitor the state of the battery as represented by for example voltage, temperature, state of charge or depth of discharge, state of health, state of power, and current flow, and modify the flow of the thermal management fluid accordingly.

For the purpose of the present invention, it is understood that the term "enclosure" may refer to a casing, container or chamber in which the cells are arranged and which is further capable of accommodating the thermal management fluid. These terms may be used interchangeably throughout the present application. A distinction between the conduits and the enclosure may be made, where the conduits refers to a tubing or piping for transporting the thermal management fluid to and from the enclosure, rather than to the enclosure per se.

In one example, the enclosure may comprise or accommodate a control circuitry, such as the circuitry described in connection with previous embodiments, or other circuitry for controlling or managing the operation and performance of the battery device. The control circuitry may for example form (or form part of) a battery management system, safety component, fuses, processing means, memory, communication circuit, gateway, battery charger, voltage regulator, current limiter, alarm, and various sensors for measuring or detecting temperature, pressure, flow, particles and conductivity.

The circuitry, such as for example a BMS, may be immersed in the thermal management liquid. In case of the enclosure being partly filled with the thermal management liquid, the circuitry may be arranged close to the part of the cells that is submerged in the liquid so as to allow also the circuitry to be in contact with the liquid.

Further, the enclosure may comprise functional means or structures such as for example structures or materials for cleaning the thermal management fluid, heat exchangers and various coatings such as graphene coatings, boron nitride coatings, amorphous diamond coatings, etcetera.

Examples of thermal management fluid, i.e., liquids and gases, that can be used according to the present invention, include liquids such perfluorinated compounds (PFCs), silicone oils and mineral oils (esters), and gases such as sulfur hexafluoride, SF6. Advantageously, the thermal management fluid has a bulk electrical resistivity above $10^8$ Ohm.

The present invention may be implemented in electric vehicles, such as electric cars and electric airplanes, in industrial equipment, satellites and other applications requiring energy storage, and particular fast charging or discharging.

As outlined above, the method may be embodied as computer-executable instructions distributed and used in the form of a computer-program product including a computer-readable medium storing such instructions. By way of example, computer-readable media may comprise computer storage media and communication media. As is well known to a person skilled in the art, computer storage media includes both volatile and non-volatile, removable and non-removable media implemented in any method or technology for storage of information such as computer readable instructions, data structures, program modules or other data. Computer storage media (or non-transitory media) includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices. Further, it is known to the skilled person that communication media (or transitory media) typically embodies computer readable instructions, data structures, program modules or other data in a modulated data signal such as a carrier wave or other transport mechanism and includes any information delivery media.

Objectives of, features of and advantages with the present invention will become apparent when studying the following detailed disclosure, the drawings and the appended claims.

BRIEF DESCRIPTION OF THE DRAWINGS

The above, as well as additional object, features and advantages of the present invention, will be better understood through the following illustrative and non-limiting detailed description of embodiments. Reference will be made to the appended drawings, on which.

All the figures are schematic, generally not to scale, and generally only show parts which are necessary in order to elucidate the invention, whereas other parts may be omitted or merely suggested.

DETAILED DESCRIPTION OF EMBODIMENTS

Figure 1A:
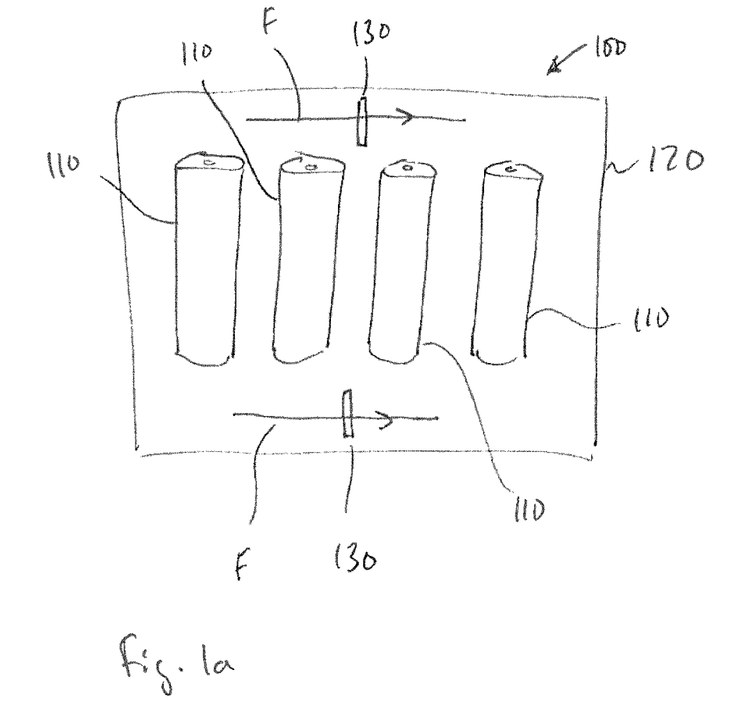
FIGS. 1a and 1b are schematic views of a battery device comprising a plurality of cylindrical cells according to some embodiments of the present invention.
Figure 1B:
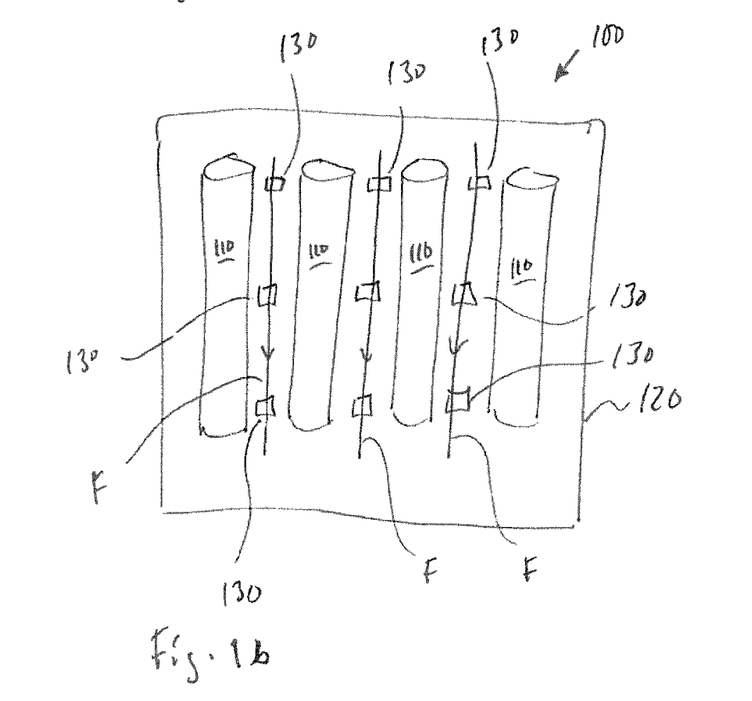

FIGS. 1a and 1b show a battery device 100 according to an embodiment. The battery device 100 comprises a plurality of cells 110, such as e.g. cylindrical cells 110, arranged side by side in an array. The device 100 further comprises an enclosure or casing 120, which is provided with a size and shape for accommodating the plurality of cells 110. The casing 120 is further adapted to hold a thermal management fluid, in the present example a liquid, in which the cells 110 may be at least partly submerged or immersed in order to allow transport of heat to and/or from the cells 110.

As shown in the present figure, one or several flow units 130 may be arranged in the casing 120, and preferably adjacent to the cells 110, in order to facilitate or enhance the flow of the thermal management fluid. FIG. 1a shows a configuration in which a first and a second flow unit 130 is arranged at the bottom and top ends, respectively, of the cylindrical cells 110. The flow units 130 may be arranged to induce a motion or flow of the thermal management fluid along the cell array, i.e., along a radial direction of the cylindrical cells 110. In the present figure, the direction of the flow is indicated by arrows F. Thus, the flow units 130 may be arranged to induce a motion or flow of the fluid from a first region of the chamber formed by the enclosure 120 to another region of the chamber.

FIG. 1b shows a similar battery device 100 as shown in FIG. 1a, with the difference that one or several flow units 130 are arranged between neighbouring cells 110. In the present example, flow units 130 are arranged in the flow path defined by the space between two cells 110 that are arranged side by side in a stacked manner. As a result, the flow units 130 may be used to increase the flow of thermal management fluid between the cells 110, and thus the cooling (or heating) of the cells 110.

It will be appreciated that the flow units 130 may be individually or separately operated, which allows for the flow pattern within the enclosure 120 to be varied depending on the actual or desired heat distribution.

In the present figures, an array of four cells 110 have been disclosed. However, it is understood that this is merely an example illustrating the benefits with arranging a flow unit in the enclosure, and that several other configurations are possible as well. The battery device may for example comprise a single cell, a plurality of cells grouped in two or more blocks, a single array or row of cells, or a plurality of arrays or row forming a two-dimensional matrix of cells.

Figure 2A:
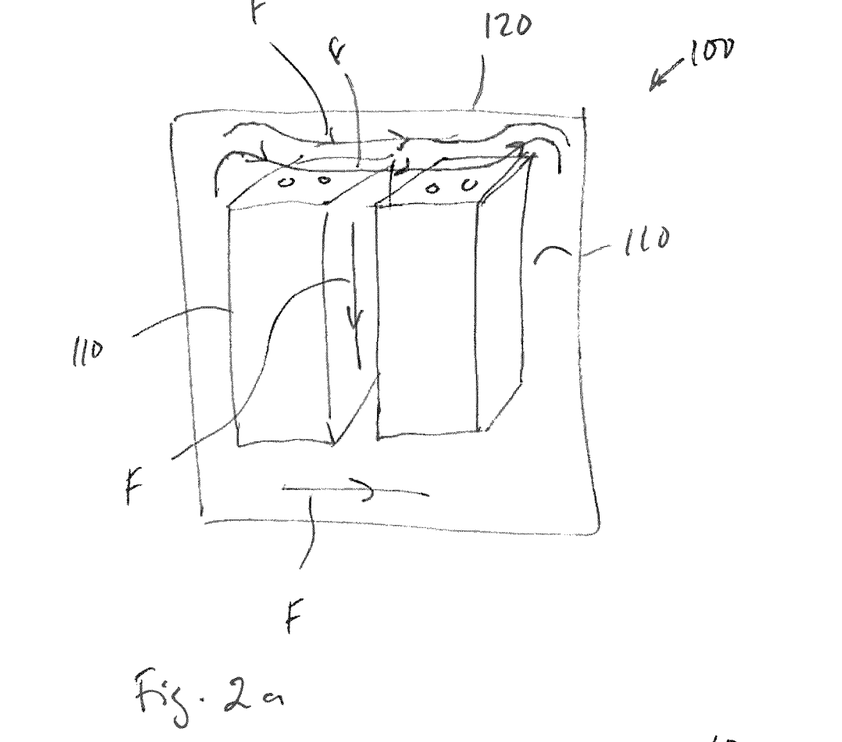
FIGS. 2a and 2b are schematic views of a battery device comprising prismatic cells according to some embodiments.
Figure 2B:
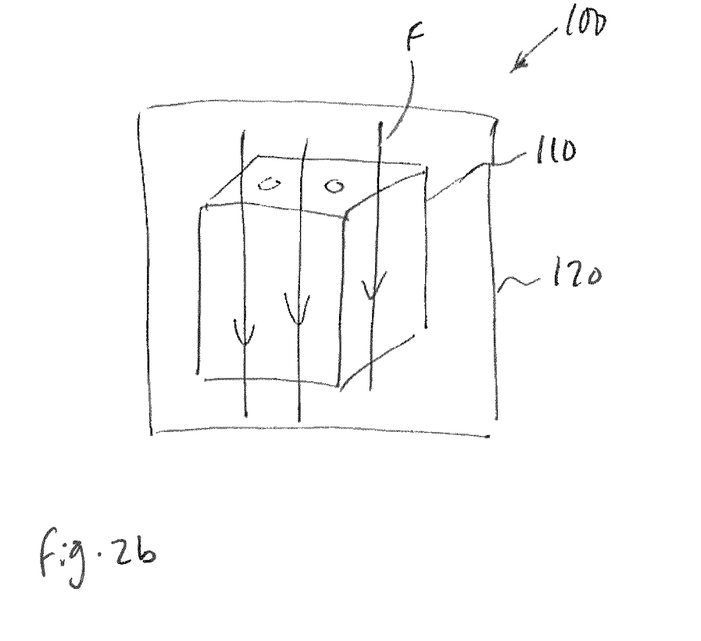

FIGS. 2a and 2b show the flow paths in a device according to an embodiment, comprising prismatic cell(s) 110. The flow units 130 may be arranged to increase the flow between the cells 110 as shown in FIGS. 1a and 2a, and to facilitate a flow over the side surfaces of a single cell 110 as shown in FIG. 2b.

Figure 2C:
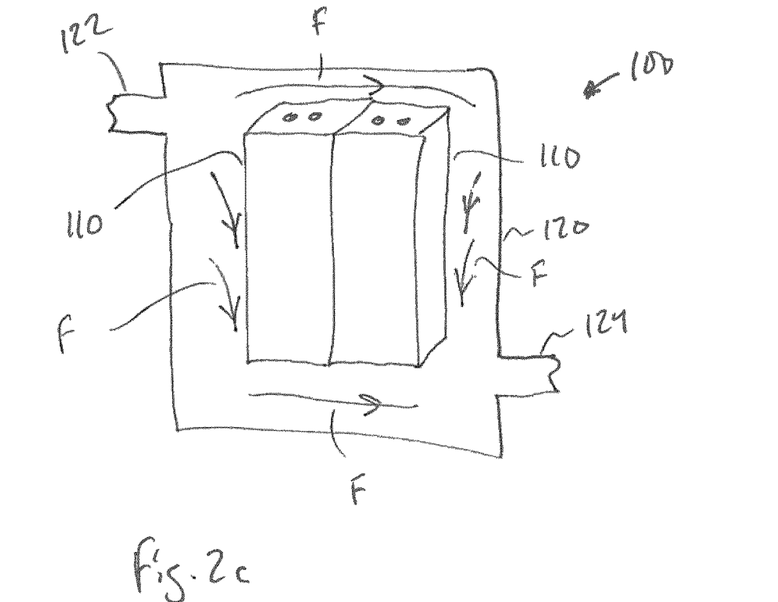
FIGS. 2c and 2d are schematic views of a battery device according to some embodiments.

FIG. 2c shows a battery device 100 according to an embodiment, comprising an enclosure 120 and a thermal management fluid similar to the previously described embodiments. In the present example, however, is disclosed a configuration in which at least two cells 110 are attached to each other, forming a pack for which one or several flow units (not shown in the present figure) may be arranged to direct a flow F of the thermal management fluid at one or several of the outer surfaces of the pack. The flow units may for example be configured to increase the flow between an inlet 122 and an outlet 124 of the of the enclosure 120, such that the thermal management fluid is brought to pass over the outer surfaces of the pack as it flows through the enclosure 120.

Figure 2D:
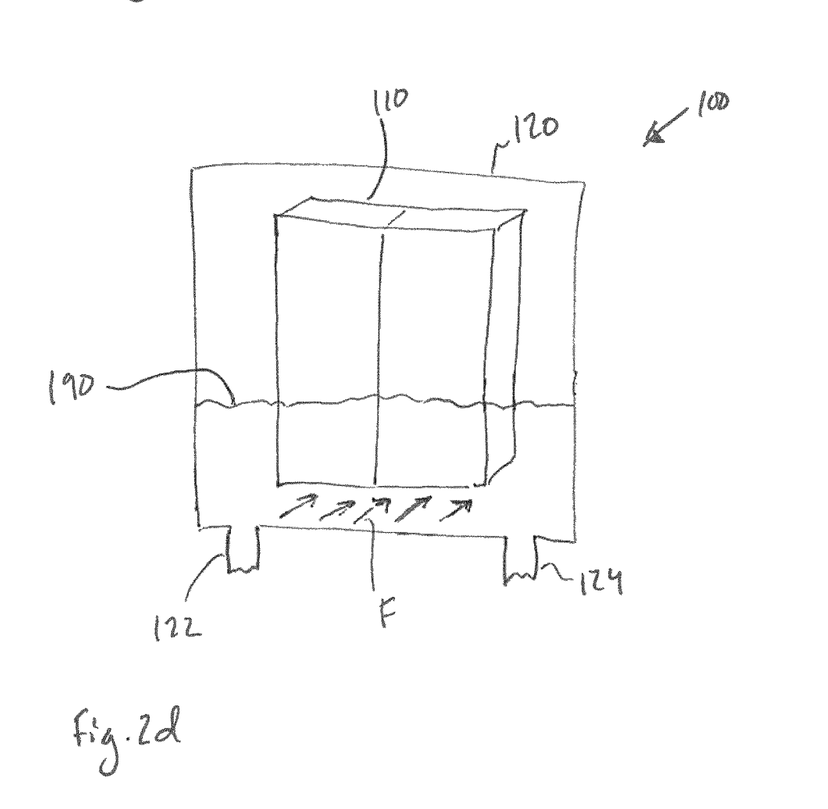

FIG. 2d shows another example of a battery device 100, which may be similarly configured as the battery devices discussed in connection with the previous embodiments. In the present example, however, is illustrated an embodiment in which the cells 110 are partly immersed in a thermal management liquid 190. As shown in FIG. 2d, the cells 110 may be oriented such that their terminals (not visible) are immersed in the liquid 190 so as to improve the thermal management in that region of the cells 110. The enclosure 120 may hence be configured to be only partly filled with thermal management liquid, such as up to e.g. 20% of the total volume of the enclosure 120, or up to 50% of the volume. The flow units (not shown in present figure) may be arranged within the enclosure 120, preferably in contact with the liquid 190, so as to control the flow F of the liquid 190. The flow units may for example be arranged to increase the flow between an inlet 122 and an outlet 124 of the enclosure 130, and/or direct the flow towards the cells 110, as indicated by the arrows F in the present figure. In a preferred embodiment, the cells may be arranged to focus a flow of liquid 190 on certain "hot spots" on the cells 110, such as e.g. the terminals, or other regions that are extra sensitive to overheating or in which excessive heating may occur. Additionally, or alternatively, one or several flow units may be arranged in other parts of the enclosure, such as for example regions not comprising any liquid phase of the thermal management fluid. In that case, the flow units may be arranged to affect, direct or even control a flow of a gaseous phase of the thermal management fluid. The gaseous phase may for example be present in systems in which phase transitions or boiling is employed for the thermal management. Further, a flow unit may be employed to recirculate new liquid to the enclosure in order to replace liquid that is missing due to for example boiling. In particular, the flow unit may be employed to facilitate the delivery of liquid to hot spots and other regions that otherwise would have been difficult to reach and/or supply with sufficient liquid by means of an external pump only. This may for example be the case for hot spots generating excessive heat, and structures comprising narrow passages, such as for example channels and narrow spaces between cells, which otherwise would risk to eventually boil dry.

Figure 3:
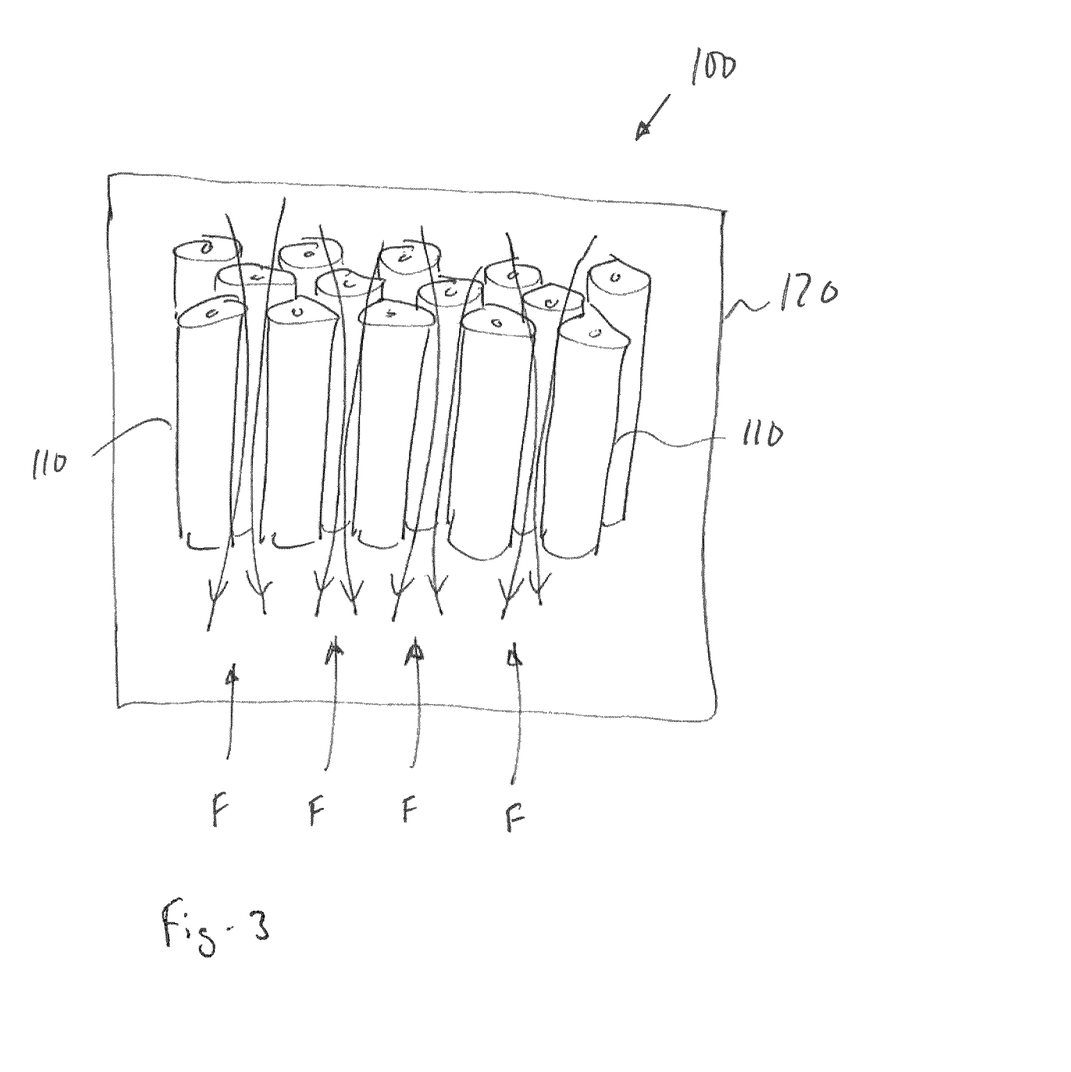
FIG. 3 illustrates the flow paths of a thermal management fluid in a battery device according to some embodiments.

FIG. 3 illustrates a battery device 100 according to some embodiments, which may be similarly configured as the embodiments described in connection with the previous figures. In the present example, the device comprises a plurality of for example cylindrical cell 110 that may be stacked side by side in two different directions, forming flow paths in the interstices between neighbouring cells 110. Depending on the width and length of the flow paths, the thermal management fluid may experience a relatively high flow resistance when flowing through the cell structure. Therefore, flow units 130 similar to the previously described one may be provided adjacent to, or between, the cells 110. Preferably, one or several flow units 130 may be arranged in or adjacent to each flow path so as to increase the flow in the path. In FIG. 3, a plurality of flow units 130 are arranged on a supporting structure, such as e.g. a bar or strip 137, mounted at a top portion of the cells 110 and a bottom portion of the cells 110, in order to facilitate or promote the fluid flow in the flow path extending between the bars 137. In FIG. 3, a single bar 137 with flow units 130 is arranged at the top portion of the stacked cells 110.

Figure 4:
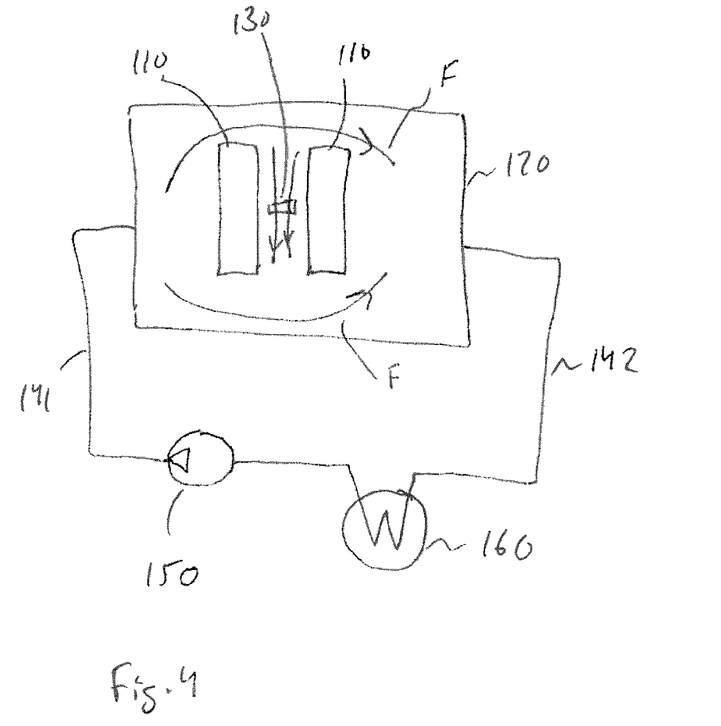
FIG. 4 is a schematic outline of a systems formed by a battery device enclosure, an external pump and a heat exchanger.

FIG. 4 is a schematic illustration of a battery device 100, comprising a first conduit 141 for supplying the thermal management fluid to the enclosure 120 and a second conduit 142 for discharging the thermal management fluid from the enclosure 120. The conduits 141, 142 may be connected to an external pump 150 that may be configured to circulate the thermal management fluid to a heat exchanger 160. The battery device 100 may be similarly configured as the embodiments described in connection with FIGS. 1 to 3, and may hence comprise a plurality of cells 110 immersed in the thermal management fluid. Further, at least one flow unit 130 may be arranged within the enclosure, such as for example between the cells 110, so as to improve the cooling of the cells 110. In this specific example, the flow of the thermal management fluid in the enclosure 120 may originate from two sources: a main flow induced by the fluid supplied to the enclosure by the first conduit 141 (and discharged from the enclosure 120 by the second conduit 142), and a secondary, internal flow enhanced or generated by the flow unit 130. Thus, the external pump 150 and the internal flow unit 130 may cooperate to form the total flow pattern within the enclosure 120.

Figure 5:
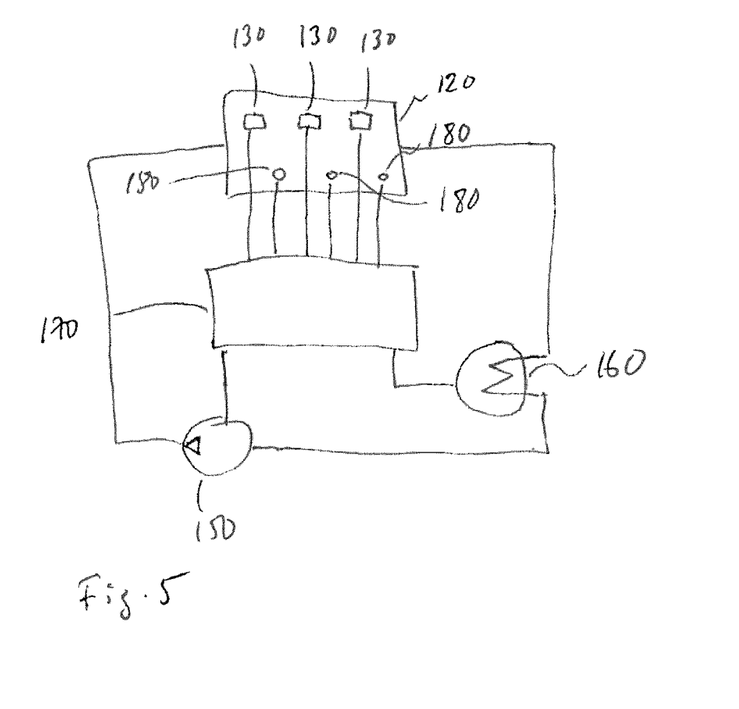
FIG. 5 schematically illustrates a battery management system comprising a control circuitry and sensor units.

FIG. 5 illustrate a battery management system, BMS, according to an embodiment of the present invention. The system may comprise a battery device 100, an external pump 150 and a heat exchanger 160 which may be similar to the example described in connection with FIG. 4. Further, the system may comprise a control circuitry, or controller or processing means, configured to operate at least some of the flow units 130 independently of each other. The system may also comprise one or several sensors, such as e.g. temperature sensors 180, that may be arranged to measure for example a temperature of the thermal management fluid, a cell 110, or heat generated in the battery device 120. In one example, the sensors 180 may be configured to provide data that can be used to determine a heat distribution in the battery device 100. This operation can be performed by the control circuitry 170, which also can be configured to operate the flow units 130 and, optionally, the external pump 150 or heat exchanger 160, based on the determined heat distribution. The control circuitry 170 may for example be configured to activate a flow unit 130 so as to increase cooling in a certain region of the device, and to deactivate a flow unit 130 to reduce the cooling or even to preserve heat in the region.

Figure 6:
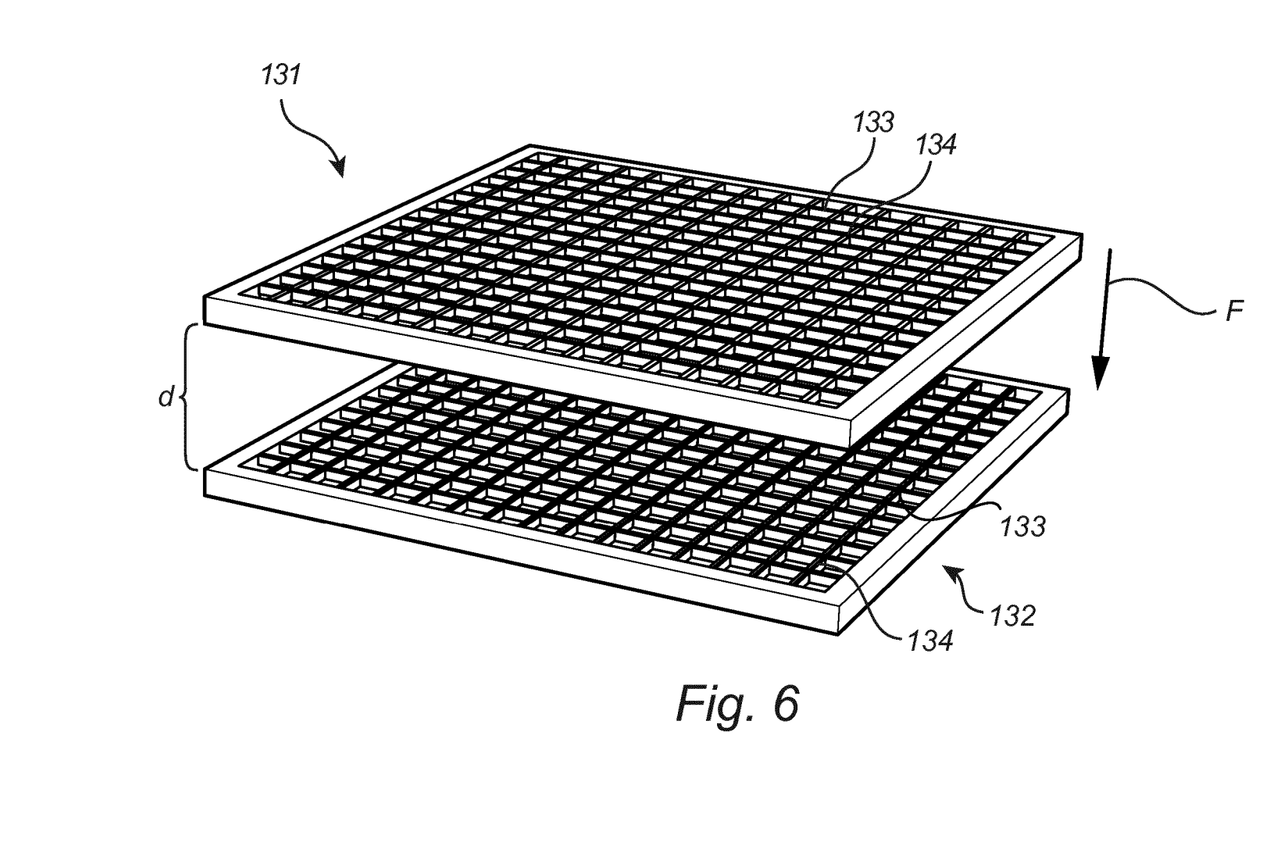
FIG. 6 is a perspective view of the electrodes of a flow unit according to an embodiment.

FIG. 6 shows a first electrode, or emitter 131, and a second electrode, or collector 132, of a flow unit 130 according to an embodiment of the present invention. This embodiment may be similarly configured as any of the flow units described with reference to the previous FIGS. 1 to 5. As shown in the present figure, at least one of the electrodes 131, 132 may comprise bridges 133 and joints 134 forming a grid structure that allows a fluid to flow through the electrode.

The emitter 131 and the collector 132 may be arranged spaced apart from each other in the flow direction (indicated by arrow F) by a positive distance d. The spacing may e.g. be maintained by a support arrangement, or grid spacer (not shown) being arranged between the emitter 131 and the collector 132. A relatively narrow gap d may be desirable since such gap may provide a relatively high electric field and thus enhance the electrohydrodynamic effect affecting the flow rate. The use of a grid spacer, which may have a well-defined thickness, may advantageously reduce the risk of a shortcut or breakdown between the emitter 131 and the collector 132.

It will also be realised that the grid may have one of a broad variety of shapes, wherein the edges and the joints e.g. may form a grating, a net, a hole pattern, a honeycomb structure, or other structures or patterns suitable for admitting a flow through the emitter 110 and/or collector 120.

In the embodiment disclosed in FIG. 6, both electrodes are formed as grids having bridges and joints. It is however appreciated that one of the electrodes (or both) may have other configurations as well.

Figure 7:
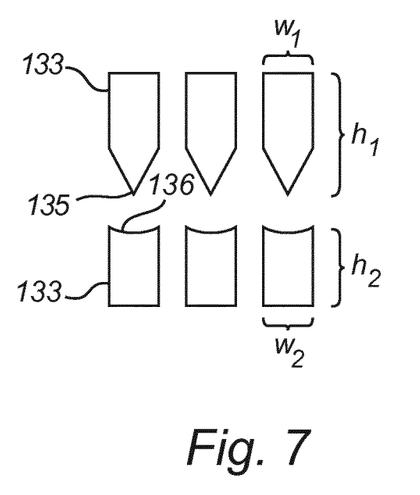
FIG. 7 is a cross section of a portion of a first and a second electrode of a flow unit according to an embodiment.

FIG. 7 shows a cross section of a portion of an emitter 131 and collector 132 of a flow unit, taken through three pairs of the bridges 133 and along a plane parallel to the flow direction F. The flow unit may be similarly configured as the flow unit of FIG. 6. According to this embodiment, the bridges 133 of the emitter 131 are arranged at a constant distanced from the bridges 133 of the collector 132, wherein the bridges 133 of the emitter may have a maximum height h in the flow direction F and a maximum gauge w in a direction orthogonal to the flow direction F. As shown in FIG. 7, the maximum height h may be greater than the maximum gauge w so as to enable a relatively stable and rigid grid structure that can carry a relatively large load in the flow direction without a risk of deforming or collapsing, and yet have a relatively large open area allowing the fluid flow. According to this embodiment, the collector 132 may have a similar relationship between the maximum height h and the maximum gauge w of the bridges 133. The ratio between the maximum height h and the maximum gauge w may e.g. be larger than 1, and more preferably larger than 2.

The cross section of the bridges 133 of the emitter 131 may comprise a downstream portion having a tapered shape forming an edge or a point 135 facing the collector 132. As the emitter 131 is subjected to an electric potential difference, there may be an electric field concentration at the edge 135 of the tapered portion which may facilitate or promote emission of electrons.

Correspondingly, the portion of the bridges 133 of the collector 132 which face the emitter 131 may be provided with a dedicated shape or surface structure for enhancing collection of the emitted electrons. The bridges 133 and/or joints 134 of the collector 132 may e.g. be provided with a concave surface portion 136 increasing the surface area, and/or a structured surface comprising microscopic protrusions and/or recesses increasing the active surface area.

The invention claimed is:

1. A rechargeable battery device, comprising:
an enclosure containing a plurality of cells at least partly immersed in thermal management liquid and at least one flow unit arranged within the enclosure to control a flow of the thermal management liquid through the enclosure;
wherein the at least one flow unit comprises a first electrode and a second electrode arranged offset from each other, the first electrode and the second electrode being connectable to a voltage source to control the flow of the thermal management liquid between the first electrode and the second electrode.

2. The device of claim 1, wherein the at least one flow unit is arranged adjacent to at least one of the plurality of cells.

3. The device of claim 1, wherein the plurality of cells are arranged side by side, and wherein the at least one flow unit is arranged between at least two neighboring cells.

4. The device of claim 1, wherein each of the plurality of cells is a cylinder cell or a prismatic cell.

5. The device of claim 1, wherein the plurality of cells is grouped into at least two separate blocks, and wherein the at least one flow unit is arranged between the blocks.

6. The device of claim 1, wherein the device is a battery pack.

7. The device of claim 1, wherein the enclosure further comprises one or more of a filter for cleaning the thermal management liquid, a heat exchanger, a graphene coating, a boron nitride coating, and an amorphous diamond coating.

8. The device of claim 1, further comprising:
a first conduit for supplying the thermal management liquid to the enclosure;
a second conduit for discharging the thermal management liquid from the enclosure; and
an external pump for circulating the thermal management liquid through the first conduit, the second conduit and the enclosure.

9. The device of claim 1, further comprising a heat exchanger connected the first and second conduit and arranged to dissipate heat from the thermal management liquid.

10. The device of claim 1, wherein the first electrode of the flow unit is formed as a grid structure arranged to allow the thermal management liquid to flow therethrough.

11. The device of claim 10, wherein:
the first electrode comprises bridges and joints forming the grid structure;
at least a portion of at least one of the bridges has a maximum height in a direction parallel to a direction of the flow and a maximum gauge in a direction orthogonal to the direction of the flow; and
the maximum height is larger than the maximum gauge.

12. The device of claim 1, comprising a plurality of flow units and a control circuitry, wherein the control circuitry is configured to operate the plurality of flow units independently of each other.

13. The device of claim 12, wherein the control circuitry is arranged within the enclosure.

14. The device of claim 12, further comprising one or more sensors for determining a heat distribution within the battery device, wherein the control circuitry is configured to operate the flow units based on the determined heat distribution.

15. The device of claim 12, wherein the control circuitry is configured to operate the flow unit to achieve a predetermined heat distribution within the battery device.

16. A method for cooling a plurality of cells of a battery rechargeable device, comprising:
   at least partly immersing the plurality of cells in thermal management liquid;
   providing at least one flow unit in the device to control a flow of the thermal management liquid through the enclosure, wherein the at least one flow unit comprises a first electrode and a second electrode arranged offset from each other, the first electrode and the second electrode being connectable to a voltage source to control the flow of the thermal management liquid between the first electrode and the second electrode; and
   operating the flow unit to direct the flow of thermal management liquid to achieve a predetermined heat distribution within the battery device.

17. The method of claim 16, further comprising directing the flow towards a specific region of a cell.

18. The method of claim 16, further comprising directing the flow towards a terminal region of a cell.

19. The method of claim 16, further comprising directing the flow towards a surface of a cell.

20. The method of claim 16, further comprising directing the flow between neighboring cells.

* * * * *